United States Patent
Kotalwar et al.

(10) Patent No.: US 10,896,196 B2
(45) Date of Patent: Jan. 19, 2021

(54) DATA RETRIEVAL FLEXIBILITY

(71) Applicant: Nokia Solutions and Networks Oy, Espoo (FI)

(72) Inventors: Jayant Kotalwar, Cupertino, CA (US); Suresh Kannan Durai Samy, Sunnyvale, CA (US); Kendall Harvey, San Jose, CA (US)

(73) Assignee: Nokia Solutions and Networks Oy, Espoo (FR)

( * ) Notice: Subject to any disclaimer, the term of this patent is extended or adjusted under 35 U.S.C. 154(b) by 108 days.

(21) Appl. No.: 16/353,701

(22) Filed: Mar. 14, 2019

(65) Prior Publication Data

US 2020/0293542 A1    Sep. 17, 2020

(51) Int. Cl.
*G06F 16/25* (2019.01)
*G06F 16/2453* (2019.01)
(Continued)

(52) U.S. Cl.
CPC .......... *G06F 16/258* (2019.01); *G06F 16/248* (2019.01); *G06F 16/24534* (2019.01); *G06F 16/24561* (2019.01); *G06F 16/252* (2019.01)

(58) Field of Classification Search
CPC .................................................... G06F 16/258
(Continued)

(56) References Cited

U.S. PATENT DOCUMENTS 5,826,269 A  * 10/1998  Hussey ............ G06Q 10/06311
6,212,513 B1 *  4/2001  Shiratori ........... G06F 16/24528
(Continued)

FOREIGN PATENT DOCUMENTS

WO   WO 2018/118478 A1   6/2018
WO   WO 2018/127747 A1   7/2018
WO   WO 2019/027934 A1   2/2019

OTHER PUBLICATIONS

Omnikrys, "How to import data from text file to mysql database" available online at [https://stackoverflow.com/questions/13579810/how-to-import-data-from-text-file-to-mysql-database], published on Nov. 27, 2012 (Year: 2012).*

(Continued)

*Primary Examiner* — Reza Nabi (74) *Attorney, Agent, or Firm* — Tong, Rea, Bentley & Kim, LLC (57) ABSTRACT

Various example embodiments for supporting data retrieval flexibility are presented. Various example embodiments for supporting data retrieval flexibility may include supporting data retrieval flexibility for retrieval of data from a device that does not maintain that data using a relational database data format by supporting operation of the device as a device that supports retrieval of that data in a relational database data format using a structured query language. Various example embodiments for supporting data retrieval flexibility may include supporting data retrieval flexibility for retrieval of data from a device by supporting retrieval of data maintained at the device based on a first data format based on generation of a database storing that data in a second data format different than the first data format and using a structured query language configured to support retrieval of the data in the second data format from the database.

22 Claims, 5 Drawing Sheets

```
SQL
QUERY  --{ candidate }--[ ]--
 311   # show aft network-instance default | sql where "[Origin protocol] = 'bgp' or [Entry ID]= '45'"
       +-------------------+---------+----------------+------------+-----------------------+-----------------+
       |Network-instance  | Entry ID|   IP Prefix    | Preference |    Next hop           | Origin protocol |   FIRST
       +===================+=========+================+============+=======================+=================+   SQL QUERY
SQL    |   default         |   45    | 10.0.0.4/32    |   170      | 1.1.4.4 (Indirect)    |   bgp           |   REQUEST/
RESPONSE   |   default     |   47    | 3ffe:0:0:a::2/128 |  170    | 3ffe:0:1:2::2 (Indirect)| bgp           |   RESPONSE
 312   |   default         |   48    | 10.0.0.2/32    |   170      | 1.1.2.2 (Indirect)    |   bgp           |   PAIR
       |   default         |   49    | 3ffe:0:0:a::4/128 |  170    | 3ffe:0:1:4::4 (Indirect)| bgp           |   310
       +-------------------+---------+----------------+------------+-----------------------+-----------------+

SQL
QUERY  --{ candidate }--[ ]--
 321   # show aft network-instance default | sql where "[Origin protocol] = 'bgp'and[Entry ID]= '45'"
       +-------------------+---------+----------------+------------+-----------------------+-----------------+
       |Network-instance  | Entry ID|   IP Prefix    | Preference |    Next hop           | Origin protocol |   SECOND
SQL    +===================+=========+================+============+=======================+=================+   SQL QUERY
RESPONSE   | default       |   45    | 10.0.0.4/32    |   170      | 1.1.4.4 (Indirect)    |   bgp           |   REQUEST/
 322   +-------------------+---------+----------------+------------+-----------------------+-----------------+   RESPONSE
                                                                                                                PAIR
                                                                                                                320
```

(51) Int. Cl.
*G06F 16/2455* (2019.01)
*G06F 16/248* (2019.01)

(58) Field of Classification Search
USPC .......................................................... 715/239
See application file for complete search history.

(56) References Cited

U.S. PATENT DOCUMENTS

| | | | | |
|---|---|---|---|---|
| 7,047,563 | B1 * | 5/2006 | Weber | H04L 63/0892 |
| | | | | 714/E11.207 |
| 7,356,601 | B1 * | 4/2008 | Clymer | H04L 63/0272 |
| | | | | 709/223 |
| 7,441,018 | B1 * | 10/2008 | Shafer | H04L 41/08 |
| | | | | 709/220 |
| 7,660,805 | B2 * | 2/2010 | Chan | G06F 16/211 |
| | | | | 707/999.101 |
| 9,143,412 | B1 | 9/2015 | Nay et al. | |
| 9,201,739 | B1 * | 12/2015 | Bagchi | G06F 11/1451 |
| 9,245,088 | B1 * | 1/2016 | O'Riordan | G06F 30/398 |
| 9,489,423 | B1 * | 11/2016 | Muthiah | G06F 16/24542 |
| 9,509,549 | B2 * | 11/2016 | Pruss | H04L 41/0813 |
| 2002/0016771 | A1 * | 2/2002 | Carothers | G06F 16/284 |
| | | | | 705/43 |
| 2002/0165961 | A1 * | 11/2002 | Everdell | H04L 41/22 |
| | | | | 709/225 |
| 2005/0289525 | A1 * | 12/2005 | David | G06F 8/427 |
| | | | | 717/143 |
| 2006/0036721 | A1 * | 2/2006 | Zhao | H04L 67/025 |
| | | | | 709/223 |
| 2006/0224576 | A1 * | 10/2006 | Liu | G06F 16/86 |
| 2007/0061786 | A1 * | 3/2007 | Zhou | G06F 8/20 |
| | | | | 717/136 |
| 2008/0080438 | A1 | 4/2008 | Gopalakrishnan et al. | |
| 2008/0242247 | A1 * | 10/2008 | Shaffer | H04L 12/1827 |
| | | | | 455/187.1 |
| 2010/0205471 | A1 | 8/2010 | Vavilala et al. | |
| 2012/0290429 | A1 * | 11/2012 | Ostroff | G06F 8/34 |
| | | | | 705/26.5 |
| 2014/0074517 | A1 * | 3/2014 | Sylvester | G06Q 10/10 |
| | | | | 705/4 |
| 2015/0169302 | A1 * | 6/2015 | DeAnna | G06F 9/541 |
| | | | | 717/140 |
| 2015/0271016 | A1 | 9/2015 | Seligson et al. | |
| 2017/0094033 | A1 * | 3/2017 | Sathyadevan | H04L 67/12 |
| 2017/0286502 | A1 * | 10/2017 | Bar-Or | G06F 16/2423 |
| 2017/0286526 | A1 * | 10/2017 | Bar-Or | G06F 8/60 |
| 2018/0131745 | A1 * | 5/2018 | Shakir | H04L 43/10 |
| 2018/0165366 | A1 | 6/2018 | Jumar | |
| 2018/0338002 | A1 * | 11/2018 | Sherrill | G06F 21/00 |
| 2019/0065533 | A1 * | 2/2019 | Pulaski | G06F 9/4887 |
| 2019/0095252 | A1 | 3/2019 | Tseng et al. | |
| 2019/0182028 | A1 * | 6/2019 | Arquero | H04L 9/3239 |
| 2020/0004866 | A1 * | 1/2020 | Dilts | G06F 16/25 |
| 2020/0004872 | A1 * | 1/2020 | Dilts | G06F 3/04842 |
| 2020/0057918 | A1 * | 2/2020 | Shin | G06K 9/6257 |
| 2020/0097910 | A1 * | 3/2020 | Krasnov | G16H 20/00 |
| 2020/0233719 | A1 * | 7/2020 | Saini | H04L 41/0806 |
| 2020/0250152 | A1 * | 8/2020 | Pulaski | G06F 16/2282 |
| 2020/0264934 | A1 * | 8/2020 | Jayaraman | G06F 9/5027 |
| 2020/0272608 | A1 * | 8/2020 | Dilts | G06F 16/26 |

OTHER PUBLICATIONS

Tahara, D., et al., "Sinew: A SQL System for Multi-Structured Data," Proceedings of the 2014 ACM SIGMOD International Conference on Management of Data, SIGMOD 2014, pp. 815-826, Jun. 22, 2014.

European Extended Search Report mailed in corresponding EP Application No. 201631843.3 dated Jun. 16, 2020, 12 pages.

* cited by examiner

SQL QUERY 311:
```
..:{ candidate }..[ ]..
# show aft network-instance default | sql where "[Origin protocol] = 'bgp' or [Entry ID]= '45'"
```

SQL RESPONSE 312:

| Network-instance | Entry ID | IP Prefix | Preference | Next hop | Origin protocol |
|---|---|---|---|---|---|
| default | 45 | 10.0.0.4/32 | 170 | 1.1.4.4 (Indirect) | bgp |
| default | 47 | 3ffe:0:0:a::2/128 | 170 | 3ffe:0:1:2::2 (Indirect) | bgp |
| default | 48 | 10.0.0.2/32 | 170 | 1.1.2.2 (Indirect) | bgp |
| default | 49 | 3ffe:0:0:a::4/128 | 170 | 3ffe:0:1:4::4 (Indirect) | bgp |

(FIRST SQL QUERY REQUEST/RESPONSE PAIR 310)

SQL QUERY 321:
```
..:{ candidate }..[ ]..
# show aft network-instance default | sql where "[Origin protocol] = 'bgp' and [Entry ID]= '45'"
```

SQL RESPONSE 322:

| Network-instance | Entry ID | IP Prefix | Preference | Next hop | Origin protocol |
|---|---|---|---|---|---|
| default | 45 | 10.0.0.4/32 | 170 | 1.1.4.4 (Indirect) | bgp |

(SECOND SQL QUERY REQUEST/RESPONSE PAIR 320)

DATA RETRIEVAL FLEXIBILITY

TECHNICAL FIELD

Various example embodiments relate generally to retrieval of device data from devices and, more particularly but not exclusively, to supporting data retrieval flexibility for retrieval of device data from devices.

BACKGROUND

Devices (e.g., routers, servers, and so forth) which may operate in various types of environments (e.g., communication networks, datacenters, enterprises, home networks, and so forth) may store data in various ways (e.g., using databases, as application data, or the like, as well as various combinations thereof).

SUMMARY

In at least some example embodiments, an apparatus includes at least one processor and at least one memory including program code, wherein the at least one memory and the program code are configured to, with the at least one processor, cause the apparatus to at least receive, by a device maintaining data based on a first data format, a query requesting a portion of the data, wherein the query is based on a database query language configured to request data based on a second data format different than the first data format, generate, by the device based on the query, a database including the portion of the data in the second data format, and provide, by the device based on operating on the database based on the query, a query response including the portion of the data in the second data format. In at least some example embodiments, the first data format comprises a binary data format, a Yet Another Next Generation (YANG) model data format, a JavaScript Object Notation (JSON) data format, or a proprietary data format. In at least some example embodiments, the database query language is a structured database query language. In at least some example embodiments, the structured database query language is a Structured Query Language (SQL). In at least some example embodiments, the query includes an SQL statement. In at least some example embodiments, the query is included within a command-line interface (CLI) command. In at least some example embodiments, the second data format is a relational database data format. In at least some example embodiments, the database including the portion of the data in the second data format is generated based on the query being included within a command-line interface (CLI) command. In at least some example embodiments, to generate the database including the portion of the data in the second data format, the at least one memory and the program code are configured to, with the at least one processor, cause the apparatus to at least identify, within the device based on the query, the portion of the data and convert the portion of the data from the first data format to the second data format. In at least some example embodiments, the portion of the data is identified in at least one of a device database of the device or an application of the device. In at least some example embodiments, to convert the portion of the data from the first data format to the second data format, the at least one memory and the program code are configured to, with the at least one processor, cause the apparatus to at least convert the portion of the data from the first data format to the second data format directly. In at least some example embodiments, to convert the portion of the data from the first data format to the second data format, the at least one memory and the program code are configured to, with the at least one processor, cause the apparatus to at least convert the portion of the data from the first data format to an intermediate data format and convert the portion of the data from the intermediate data format to the second data format. In at least some example embodiments, the intermediate data format comprises a plain text data format. In at least some example embodiments, the plain text data format comprises a comma separated value (CSV) data format. In at least some example embodiments, to provide the query response including the portion of the data in the second data format, the at least one memory and the program code are configured to, with the at least one processor, cause the apparatus to at least operate on the database, based on the query, to obtain the portion of the data in the second data format and generate the query response including the portion of the data in the second data format. In at least some example embodiments, the query response is included within a command-line interface (CLI) response. In at least some example embodiments, the query response is provided to a user terminal. In at least some example embodiments, the at least one memory and the program code are configured to, with the at least one processor, cause the apparatus to at least destroy, by the device based on a determination that the query response has been provided, the database. In at least some example embodiments, the at least one memory and the program code are configured to, with the at least one processor, cause the apparatus to at least destroy, by the device based on a determination that the portion of the data is no longer needed, the database. In at least some example embodiments, the device is a router or a server. In at least some example embodiments, the device is a router and the data is router operational data of the router.

In at least some example embodiments, a non-transitory computer-readable medium includes instructions configured to cause an apparatus to at least receive, by a device maintaining data based on a first data format, a query requesting a portion of the data, wherein the query is based on a database query language configured to request data based on a second data format different than the first data format, generate, by the device based on the query, a database including the portion of the data in the second data format, and provide, by the device based on operating on the database based on the query, a query response including the portion of the data in the second data format. In at least some example embodiments, the first data format comprises a binary data format, a Yet Another Next Generation (YANG) model data format, a JavaScript Object Notation (JSON) data format, or a proprietary data format. In at least some example embodiments, the database query language is a structured database query language. In at least some example embodiments, the structured database query language is a Structured Query Language (SQL). In at least some example embodiments, the query includes an SQL statement. In at least some example embodiments, the query is included within a command-line interface (CLI) command. In at least some example embodiments, the second data format is a relational database data format. In at least some example embodiments, the database including the portion of the data in the second data format is generated based on the query being included within a command-line interface (CLI) command. In at least some example embodiments, to generate the database including the portion of the data in the second data format, the non-transitory computer-readable medium includes instructions configured to cause the apparatus to at least identify, within the device based on the query, the portion of the data and convert the portion of the data from the first data format to the second data format. In at least some example embodiments, the portion of the data is identified in at least one of a device database of the device or an application of the device. In at least some example embodiments, to convert the portion of the data from the first data format to the second data format, the non-transitory computer-readable medium includes instructions configured to cause the apparatus to at least convert the portion of the data from the first data format to the second data format directly. In at least some example embodiments, to convert the portion of the data from the first data format to the second data format, the non-transitory computer-readable medium includes instructions configured to cause the apparatus to at least convert the portion of the data from the first data format to an intermediate data format and convert the portion of the data from the intermediate data format to the second data format. In at least some example embodiments, the intermediate data format comprises a plain text data format. In at least some example embodiments, the plain text data format comprises a comma separated value (CSV) data format. In at least some example embodiments, to provide the query response including the portion of the data in the second data format, the non-transitory computer-readable medium includes instructions configured to cause the apparatus to at least operate on the database, based on the query, to obtain the portion of the data in the second data format and generate the query response including the portion of the data in the second data format. In at least some example embodiments, the query response is included within a command-line interface (CLI) response. In at least some example embodiments, the query response is provided to a user terminal. In at least some example embodiments, the non-transitory computer-readable medium includes instructions configured to cause the apparatus to at least destroy, by the device based on a determination that the query response has been provided, the database. In at least some example embodiments, the non-transitory computer-readable medium includes instructions configured to cause the apparatus to at least destroy, by the device based on a determination that the portion of the data is no longer needed, the database. In at least some example embodiments, the device is a router or a server. In at least some example embodiments, the device is a router and the data is router operational data of the router.

In at least some example embodiments, a method includes receiving, by a device maintaining data based on a first data format, a query requesting a portion of the data, wherein the query is based on a database query language configured to request data based on a second data format different than the first data format, generating, by the device based on the query, a database including the portion of the data in the second data format, and providing, by the device based on operating on the database based on the query, a query response including the portion of the data in the second data format. In at least some example embodiments, the first data format comprises a binary data format, a Yet Another Next Generation (YANG) model data format, a JavaScript Object Notation (JSON) data format, or a proprietary data format. In at least some example embodiments, the database query language is a structured database query language. In at least some example embodiments, the structured database query language is a Structured Query Language (SQL). In at least some example embodiments, the query includes an SQL statement. In at least some example embodiments, the query is included within a command-line interface (CLI) command. In at least some example embodiments, the second data format is a relational database data format. In at least some example embodiments, the database including the portion of the data in the second data format is generated based on the query being included within a command-line interface (CLI) command. In at least some example embodiments, generating the database including the portion of the data in the second data format includes identifying, within the device based on the query, the portion of the data and converting the portion of the data from the first data format to the second data format. In at least some example embodiments, the portion of the data is identified in at least one of a device database of the device or an application of the device. In at least some example embodiments, converting the portion of the data from the first data format to the second data format includes converting the portion of the data from the first data format to the second data format directly. In at least some example embodiments, converting the portion of the data from the first data format to the second data format includes converting the portion of the data from the first data format to an intermediate data format and converting the portion of the data from the intermediate data format to the second data format. In at least some example embodiments, the intermediate data format comprises a plain text data format. In at least some example embodiments, the plain text data format comprises a comma separated value (CSV) data format. In at least some example embodiments, providing the query response including the portion of the data in the second data format includes operating on the database, based on the query, to obtain the portion of the data in the second data format and generating the query response including the portion of the data in the second data format. In at least some example embodiments, the query response is included within a command-line interface (CLI) response. In at least some example embodiments, the query response is provided to a user terminal. In at least some example embodiments, the method includes destroying, by the device based on a determination that the query response has been provided, the database. In at least some example embodiments, the method includes destroying, by the device based on a determination that the portion of the data is no longer needed, the database. In at least some example embodiments, the device is a router or a server. In at least some example embodiments, the device is a router and the data is router operational data of the router.

In at least some example embodiments, an apparatus includes means for receiving, by a device maintaining data based on a first data format, a query requesting a portion of the data, wherein the query is based on a database query language configured to request data based on a second data format different than the first data format, means for generating, by the device based on the query, a database including the portion of the data in the second data format, and means for providing, by the device based on operating on the database based on the query, a query response including the portion of the data in the second data format. In at least some example embodiments, the first data format comprises a binary data format, a Yet Another Next Generation (YANG) model data format, a JavaScript Object Notation (JSON) data format, or a proprietary data format. In at least some example embodiments, the database query language is a structured database query language. In at least some example embodiments, the structured database query language is a Structured Query Language (SQL). In at least some example embodiments, the query includes an SQL statement. In at least some example embodiments, the query is included within a command-line interface (CLI) command. In at least some example embodiments, the second data format is a relational database data format. In at least some example embodiments, the database including the portion of the data in the second data format is generated based on the query being included within a command-line interface (CLI) command. In at least some example embodiments, the means for generating the database including the portion of the data in the second data format includes means for identifying, within the device based on the query, the portion of the data and means for convert the portion of the data from the first data format to the second data format. In at least some example embodiments, the portion of the data is identified in at least one of a device database of the device or an application of the device. In at least some example embodiments, the means for converting the portion of the data from the first data format to the second data format includes means for converting the portion of the data from the first data format to the second data format directly. In at least some example embodiments, the means for converting the portion of the data from the first data format to the second data format includes means for converting the portion of the data from the first data format to an intermediate data format and means for converting the portion of the data from the intermediate data format to the second data format. In at least some example embodiments, the intermediate data format comprises a plain text data format. In at least some example embodiments, the plain text data format comprises a comma separated value (CSV) data format. In at least some example embodiments, the means for providing the query response including the portion of the data in the second data format includes means for operating on the database, based on the query, to obtain the portion of the data in the second data format and means for generating the query response including the portion of the data in the second data format. In at least some example embodiments, the query response is included within a command-line interface (CLI) response. In at least some example embodiments, the query response is provided to a user terminal. In at least some example embodiments, the apparatus includes means for destroying, by the device based on a determination that the query response has been provided, the database. In at least some example embodiments, the apparatus includes means for destroying, by the device based on a determination that the portion of the data is no longer needed, the database. In at least some example embodiments, the device is a router or a server. In at least some example embodiments, the device is a router and the data is router operational data of the router.

BRIEF DESCRIPTION OF THE DRAWINGS

The teachings herein can be readily understood by considering the following detailed description in conjunction with the accompanying drawings, in which:

FIG. 3 depicts example embodiments of SQL query requests and associated SQL query responses generated based on configuration of a router to support data retrieval flexibility for retrieval of data from a database based on SQL;

To facilitate understanding, identical reference numerals have been used, where possible, to designate identical elements that are common to the figures.

DETAILED DESCRIPTION

Various example embodiments for supporting data retrieval flexibility are presented. Various example embodiments for supporting data retrieval flexibility may include supporting data retrieval flexibility for retrieval of data from a device that does not maintain that data using a relational database data format. Various example embodiments for supporting data retrieval flexibility may include supporting data retrieval flexibility for retrieval of data from a device that does not maintain that data using a relational database data format by supporting operation of the device as a device that supports retrieval of that data in a relational database data format using a structured query language. Various example embodiments for supporting data retrieval flexibility may include supporting data retrieval flexibility for retrieval of data from a device by supporting retrieval of data maintained at the device based on a first data format based on generation or creation of a database storing that data in a second data format different than the first data format and using a structured query language configured to support retrieval of the data in the second data format from the database. Various example embodiments for supporting data retrieval flexibility may include receiving, by a device maintaining data based on a first data format (e.g., a binary data format, a Yet Another Next Generation (YANG) model data format, a JavaScript Object Notation (JSON) data format, a proprietary data format, or the like), a query requesting a portion of the data where the query is based on a database query language (e.g., a structure database query language, such as Structured Query Language (SQL), SQLite, or the like) configured to request data based on a second data format different than the first data format (e.g., a relational database data format), generating, by the device based on the query, a database including the portion of the data in the second data format, and providing, by the device based on operating on the database based on the query, a query response including the portion of the data in the second data format. It will be appreciated that these and various other example embodiments and advantages or potential advantages of supporting data retrieval flexibility may be further understood by way of reference to the various figures, which are discussed further below.

Figure 1:
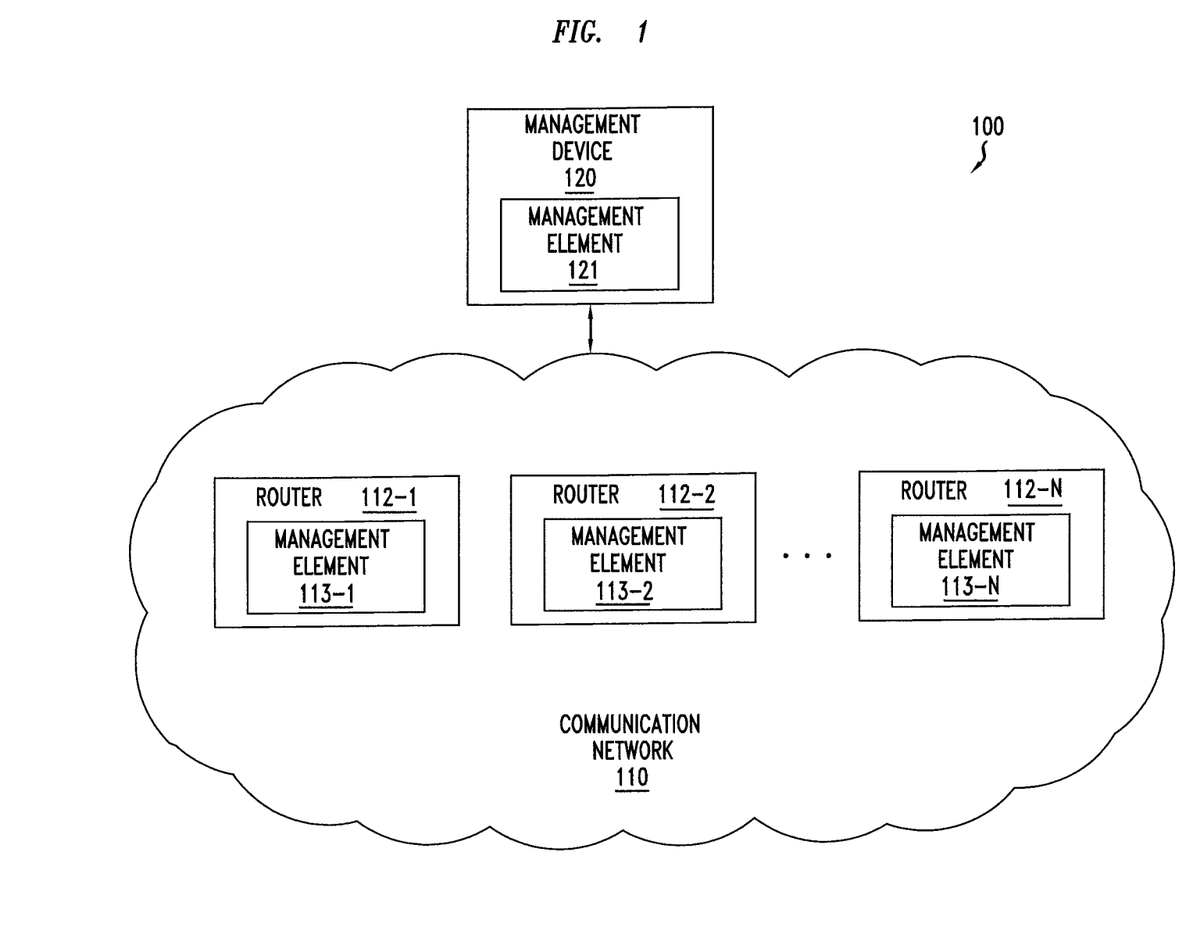
FIG. 1 depicts an example embodiment of a communication system including a communication network and a management device configured to manage the communication network.

FIG. 1 depicts an example embodiment of a communication system including a communication network and a management device configured to manage the communication network.

The communication system 100, as indicated above, includes a communication network 110 and a management device 120 configured to manage the communication network 110.

The communication network 110 may include any network which may be managed by a management device 120. For example, the communication network 110 may be an operator network, an enterprise network, or the like. For example, the communication network 110 may be an access network, a core network, a backhaul network, a datacenter network, or the like. For example, the communication network 110 may be a physical communication network, a virtualized communication network (e.g., virtualized based on network function virtualization (NFV) techniques or other suitable virtualization techniques), or the like. It will be appreciated that, although primarily presented herein within the context of specific types of communication networks, various other types of communication networks may be supported.

The communication network 110 includes a set of routers 112-1-112-N (collectively, routers 112). The routers 112 may be configured to provide various communication services for supporting communications within communication network 110. The routers 112 may be arranged in various network topologies, which may depend on the type of communication network 110 in which the routers 112 are disposed. For example, the routers 112 may be arranged in a mesh topology (e.g., in a network operator backhaul network), in a spine-and-leaf topology (e.g., in a datacenter network), or the like. The routers 112 may be configured to be managed by the management device 120. It will be appreciated that, although primarily presented herein as including specific types devices (illustratively, routers 112), communication network 110 may include various other types of devices (e.g., switches, hubs, bridges, or the like, as well as various combinations thereof).

The management device 120 may be configured to support management of the communication network 110. The management device 120 may be configured to support management of the communication network 110 for various management purposes, at various management scales, or the like, as well as various combinations thereof. For example, the management device 120 may be configured to support configuration functions, monitoring functions, maintenance functions, or the like, as well as various combinations thereof. For example, the management device 120 may be configured to support service-level management (e.g., as a service management system or other similar system), network-level management (e.g., as a network management system (NMS) or other similar system), element-level management (e.g., as an element management system (EMS) or other similar system), or the like, as well as various combinations thereof. The management device 120 may be one of various types of devices which may be used to support management functions for communication network 110, such as a workstation of a management system configured to support management of the routers 112, a user device (e.g., a laptop, a tablet, a smartphone, or the like) configured to provide remote management access to the routers 112, a local console connected to one or more of the routers 112, or the like. It will be appreciated that the management device 120 may be configured to support various other management capabilities for managing the communication network 110.

The management device 120 is configured to manage the routers 112 of communication network 110. The management device 120 may support various capabilities which enable the management device 120 to access and manage routers 112 and, similarly, routers 112 may support various capabilities which enable access and management by the management device 120. For example, such capabilities may include management interfaces (e.g., command line interfaces (CLIs), graphical user interfaces (GUIs), or the like), management applications (e.g., router configuration applications, router status retrieval applications, or the like), management elements (e.g., devices, modules, systems, subsystems or the like), communications capabilities (e.g., inter-process communications capabilities such as remote procedure calls (RPCs), protocols such as telnet or secure shell (SSH), or the like), or the like, as well as various combinations thereof. It will be appreciated that these capabilities may be considered to be represented in FIG. 1 by the management elements 113-1-113-N on routers 112-1-112-N, respectively, and the management element 121 on management device 120.

In at least some embodiments, for example, the communication network 110 may be configured to support data retrieval flexibility for retrieval of data from a router 112. In at least some embodiments, for example, a router 112 of the communication network 110 may be configured to support data retrieval flexibility for retrieval of data from a router 112. A router 112 of the communication network 110 may be configured to support retrieval of data from the router 112 in a relational database data format using a structured query language. A router 112 of the communication network 110 may be configured to support retrieval of data from the router 112 by supporting retrieval of data maintained at the device based on a first data format based on generation or creation of a database storing that data in a second data format different than the first data format and using a structured query language configured to support retrieval of the data in the second data format from the database. An example embodiment for supporting retrieval of router operational data from a router (e.g., from a database of the router) in a relational database data format using a structured query language (e.g., SQL) is presented in FIG. 2.

It will be appreciated that, although primarily presented with respect to specific types, numbers, and arrangements of elements, communication system 100 may include various other types, numbers and arrangements of elements.

Figure 2:
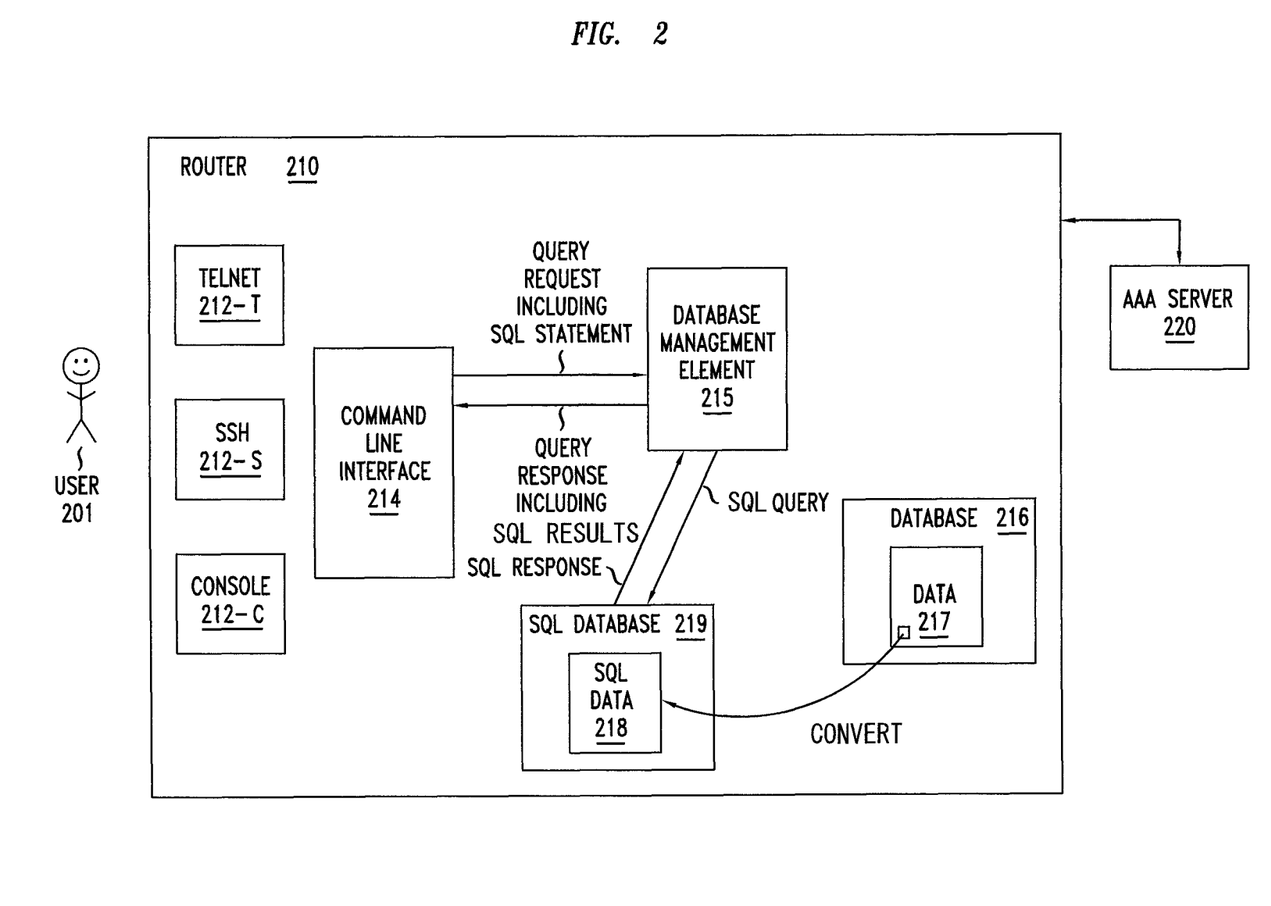
FIG. 2 depicts an example embodiment of router having a database and configured to support data retrieval flexibility for retrieval of data from the database based on SQL.

FIG. 2 depicts an example embodiment of router having a database and configured to support data retrieval flexibility for retrieval of data from the database based on SQL.

As presented in FIG. 2, a user 201 is able to manage a router 210 in conjunction with use of an Authentication, Authorization, and Accounting (AAA) server 220. The router 210 includes a set of router access capabilities 212, a command-line interface (CLI) 214, a database management element 215, and a database 216. It will be appreciated that, although primarily presented herein with respect to embodiments in which the user 201 is human, various example embodiments presented herein may be used or adapted for use in conjunction with non-human users which may automatically interact with the router 210 (e.g., a device, a program, an application, or the like).

The router access capabilities 212 of the router 210 are configured to enable the user 201 to access the router 210. The router access capabilities 212 may be configured to enable the user 201 to access the router 210 locally (illustratively, denoted as console 212-C) or remotely (illustratively, denoted as telnet 212-T and SSH 212-S).

The CLI 214 of the router 210, which is accessible via the router access capabilities 212, provides an interface via which the user may interact with the router 210 for performing various functions on the router 210 (e.g., data access functions such as accessing data from the database 216 of the router 210, router control capabilities such as executing commands for configuring the router 210 or configuring services supported by the router 210, or the like, as well as various combinations thereof).

The database 216 of the router 210 stores data 217 for the router 210. The data 217 may include router operational data associated with operation of the router 210, such as router configuration information (e.g., interface configuration information), route information for routes supported by the router 210, or the like, as well as various combinations thereof. The router 210 may store the data 217 in the database 216 using a binary data format, a YANG model data format, a JSON data format, a proprietary data format, or the like, as well as various combinations thereof.

The database management element 215 of the router 210, as discussed further below, may be configured to provide various functions configured to support retrieval of data 217 from the database 216 using SQL (e.g., SQL, SQLite, or the like).

The AAA server 220 is configured to perform authentication, authorization, and accounting functions for router 210. The communication between the router 210 and the AAA server 220 may be based on use of any suitable AAA protocol (e.g., Remote Authentication Dial-In User Service (RADIUS), Terminal Access Controller Access-Control System (TACACS), or the like).

The router 210 is configured to support retrieval of data 217 from the database 216 using SQL (which may, in some sense, be considered to be support for operation of the database 216 as an SQL database even though the data 217 in the database 216 is maintained in a data format that does not support use of SQL as the database query language for retrieval of the data 217). The router 210 may support retrieval of data 217 from the database 216 using SQL by supporting dynamic generation of a relational database based on SQL (denoted, for purposes of clarity, as an SQL database 219), based on the database 216, such that the router 210 may operate on the SQL database 219 in order to provide an SQL response to an SQL statement received in a query request entered via the CLI 214. The router 210 may support retrieval of data 217 from the database 216 using SQL by detecting an SQL statement requesting a portion of the data 217 of the database 216, identifying the portion of the data 217 being requested by the SQL statement, extracting from the database 216 the portion of the data 217 requested by the SQL statement, converting the portion of the data 217 extracted from the database 216 from the data format of the database 216 into an relational database data format which may be retrieved based on SQL (denoted, for purposes of clarity, as SQL data 218), generating the SQL database 219 on the router 210 such that the SQL database 219 includes the SQL data 218, operating on the SQL database 219 based on the SQL statement to retrieve the SQL data 218, and providing an query response including the SQL data 218 to the CLI 214 for presentation to the user 201. The SQL data 218 in the SQL database 219 may be retrieved based on any suitable version of SQL, such as SQL, SQLite, or any other suitable version of SQL. It will be appreciated that at least some such functions of the router 210 may be performed by the database management element 215 of the router 210.

The database management element 215 of the router 210 is configured to detect query requests and handle the query requests using the data 217 of the database 216. The database management element 215 of the router 210 is configured to detect query requests executed via the CLI 214 (e.g., executed by the user 201 via the CLI 214). The database management element 215 of the router 210, based on detection of a query request that does not include an SQL statement, may allow the query request to pass through to the database 216 such that the query request may be answered as would normally be done where the user 201 is not attempting to use SQL to query the database 216. The database management element 215 of the router 210, based on detection of a query request that does include an SQL statement, may initiate handling of the query request based on capabilities for supporting retrieval of data 217 from the database 216 using SQL. The following description assumes receipt of a query request that is based on SQL (e.g., a query request including an SQL statement). It will be appreciated that a query request detected by the database management element 215 of the router 210, whether or not based on SQL, is expected to request a portion of the data 217 of the database (e.g., one or more data items or data records meeting some query criteria specified as part of the query request). It is noted that examples of query requests including SQL statements are presented with respect to FIG. 3.

The database management element 215 of the router 210 is configured to identify the portion of the data 217 being requested. The portion of the data 217 that is requested, as indicated above, may include one or more data items or data records of the database 216 that meet some query criteria specified as part of the query request (e.g., any interfaces of the router 210 that meet particular query criteria, any routes supported by the router 210 that meet particular query criteria, or the like). The database management element 215 of the router 210 may identify the portion of the data 217 that is being requested in the query request executed via the CLI 214 from the SQL statement that is included in the query request executed via the CLI 214.

The database management element 215 of the router 210 is configured to extract, from the database 216, the portion of the data 217 being requested. The extraction of the portion of the data 217 being requested may be based on a typical database lookup and extraction based on the identification of the portion of the data 217 being requested. The portion of the data 217 that is extracted from the database 216 is in the data format supported by the database 216 (e.g., a binary data format, a YANG model data format, a JSON data format, a proprietary data format, or other suitable format).

The database management element 215 of the router 210 is configured to convert the portion of the data 217 extracted from the database 216 from the data format of the database 216 into a relational database data format, capable of being required based on SQL, to provide the SQL data 218.

The portion of the data 217 extracted from the database 216 may be converted from the data format of the database 216 into the relational database data format to provide the SQL data 218 using a direct conversion (i.e., a direct conversion from the data format supported by the database 216 to the relational database data format to provide the SQL data 218).

The portion of the data 217 extracted from the database 216 may be converted from the data format of the database 216 into the relational database data format to provide the SQL data 218 using an indirect conversion via one or more intermediate data formats. For example, the portion of the data 217 extracted from the database 216 may be converted from the data format of the database 216 into the relational database data format to provide the SQL data 218 by converting the portion of the data 217 from the data format supported by the database 216 to an intermediate data format and converting the portion of the data in the intermediate format to the relational database data format to provide the SQL data 218. The intermediate data format may depend on the starting data format (namely, the data format of the database 216) and the final data format (namely, the relational database data format to provide the SQL data 218). For example, the intermediate data format may be a comma separated value (CSV) format or other suitable type of data format. It will be appreciated that, although primarily described with respect to use of a single intermediate data format to convert the portion of the data 217 extracted from the database 216 from the data format of the database 216 into the relational database data format to provide the SQL data 218, in at least some embodiments multiple intermediate data formats may be used to convert the portion of the data 217 extracted from the database 216 from the data format of the database 216 into the relational database data format to provide the SQL data 218 (e.g., converting from the portion of the data 217 extracted from the database 216 from the data format of the database 216 into a first intermediate format, converting the data in the first intermediate format to a second intermediate format, and so forth, until converting the data from the final intermediate format into the relational database data format to provide the SQL data 218).

The database management element 215 of the router 210 is configured to generate the SQL database 219 on the router 210 such that the SQL database 219 includes the SQL data 218 created from portion of the data 217 requested in the query request and extracted from the database 216 based on inclusion of the SQL statement in the query request.

The database management element 215 of the router 210 is configured to operate on the SQL database 219, rather than the database 216, to obtain the requested data (i.e., the SQL data 218 which is a relational database data formatted version of the portion of the data 217 that was originally requested in the query request) for inclusion in a query response that is provided in response to the query request. The database management element 215 of the router 210 is configured to operate on the SQL database 219 based on the SQL statement included in the query request. The database management element 215 of the router 210 is configured to operate on the SQL database 219, based on the SQL statement, to retrieve the SQL data 218 (again, the SQL data 218 which is a relational database data formatted version of the portion of the data 217 that was originally requested in the query request).

The database management element 215 of the router 210 is configured to provide a query response, including the SQL data 218 obtained in response to the query request, to the CLI 214 for presentation via the CLI 214. This query response may be considered to include an SQL response to the SQL statement included in the query request (which also may be referred to as SQL results of the SQL query executed on the SQL database 219 dynamically generated at the router 210 responsive to the query request including the SQL statement). The query response including the SQL data 218 may be presented via the CLI 214 in various formats, which may depend on the type of data requested, the relational database data format used, the SQL statement used, or the like, as well as various combinations thereof. For example, the query response including the SQL data 218 may be presented via the CLI 214 in a list format, a table format, or the like, as well as various combinations thereof. It is noted that examples of query responses including SQL query results are presented with respect to FIG. 3.

It will be appreciated that, although primarily presented herein with respect to embodiments in which the query response including the SQL data 218 is provided via the CLI 214, the query response including the SQL data 218 may be provided via one or more other interfaces in place of or in addition to being provided via the CLI 214.

The database management element 215 of the router 210, after providing the query response including the SQL data 218 to the CLI 214, may destroy the SQL database 219 that was dynamically generated at the router 210 for purposes of handling the SQL statement in the query request. The database management element 215 of the router 210 may destroy the SQL database 219 immediately after providing the query response including the SQL data 218 to the CLI 214, after a threshold length of time after providing the query response including the SQL data 218 to the CLI 214 (e.g., based on a determination that the portion of the data 217 for which the SQL database 219 was generated has not been requested for a threshold length of time), or the like.

It will be appreciated that, although primarily presented herein with respect to various embodiments in which the database management element 215 provides database management functions at the router 210 for supporting retrieval of data 217 from the database 216 using SQL based on generation of the SQL database 219 including SQL data 218 (and, thus, in which interaction between the CLI 214 and the SQL database 219 is primarily described as being via the database management element 215), in at least some example embodiments database management functions at the router 210 for supporting retrieval of data 217 from the database 216 using SQL based on generation of the SQL database 219 including SQL data 218 may be provided in other ways (e.g., using one or more elements in addition to database management element 215, without using database management element 215, or the like).

It will be appreciated that the router 210 may be configured to support various other functions for supporting flexible retrieval of data 217 from the database 216 based on SQL.

FIG. 3 depicts example embodiments of SQL query requests and associated SQL query responses generated based on configuration of a router to support data retrieval flexibility for retrieval of data from a database based on SQL.

As depicted in FIG. 3, a first SQL query request/response pair 310 includes an SQL query 311 that is included within a CLI command executed by a user via a CLI, which results in an associated SQL response 312 being displayed to the user via the CLI. The SQL query 311 is a query for default network instances for which the origin protocol is BGP or the entry ID is "45". The resulting SQL response 312 that is displayed is a table including each of the default network instances that meet the query criteria of the origin protocol being BGP or the entry ID being "45" (illustratively, four default interfaces have been identified as meeting the query criteria of SQL query 311). It will be appreciated that the SQL response 312 is generated based on generation of an SQL database, from the router database, that includes the information requested and execution of the SQL query 311 on the SQL database to produce the SQL response 312 that is displayed via the CLI.

As depicted in FIG. 3, a second SQL query request/response pair 320 includes an SQL query 321 that is included within a CLI command executed by a user via a CLI, which results in an associated SQL response 322 being displayed to the user via the CLI. The SQL query 321 is a query for default network instances for which the origin protocol is BGP and the entry ID is "45". The resulting SQL response 322 that is displayed is a table including each of the default network instances that meet the query criteria of the origin protocol being BGP and the entry ID being "45" (illustratively, only one default interface has been identified as meeting the query criteria of SQL query 321). It will be appreciated that the SQL response 322 is generated based on generation of an SQL database, from the router database, that includes the information requested and execution of the SQL query 321 on the SQL database to produce the SQL response 322 that is displayed via the CLI.

It will be appreciated that, although primarily presented herein within the context of embodiments for supporting data retrieval flexibility for a particular type of device (namely, a router) maintaining a particular type of data (namely, router operational data) in a particular way (namely, in a database) using a particular data format (namely, using one or more of a binary data format, a YANG model data format, a JSON data format, a proprietary data format, or the like) and utilizing a particular type of database (namely, a relational database) supporting storage of the data in a particular data format (namely, a relational database data format) and supporting retrieval of the data from the database using a particular type of database query language (namely, SQL or SQLite), various example embodiments for supporting data retrieval flexibility for a router that are presented herein may be used or adapted for use in supporting database flexibility for various other types of device (e.g., switches, servers, or the like), for devices maintaining various other types of data (e.g., user data, service data, or the like), for devices maintaining data in various other ways (e.g., in an application, in a memory, or the like), for devices maintaining data using other data formats, utilizing other types of databases (e.g., other types of relational databases), utilizing other data formats (e.g., other types of relational database data formats), based on other types of database query languages (e.g., other structured database query languages), or the like, as well as various combinations thereof. As such, as discussed further below, various more general embodiments are further presented with respect to FIG. 4.

Figure 4:
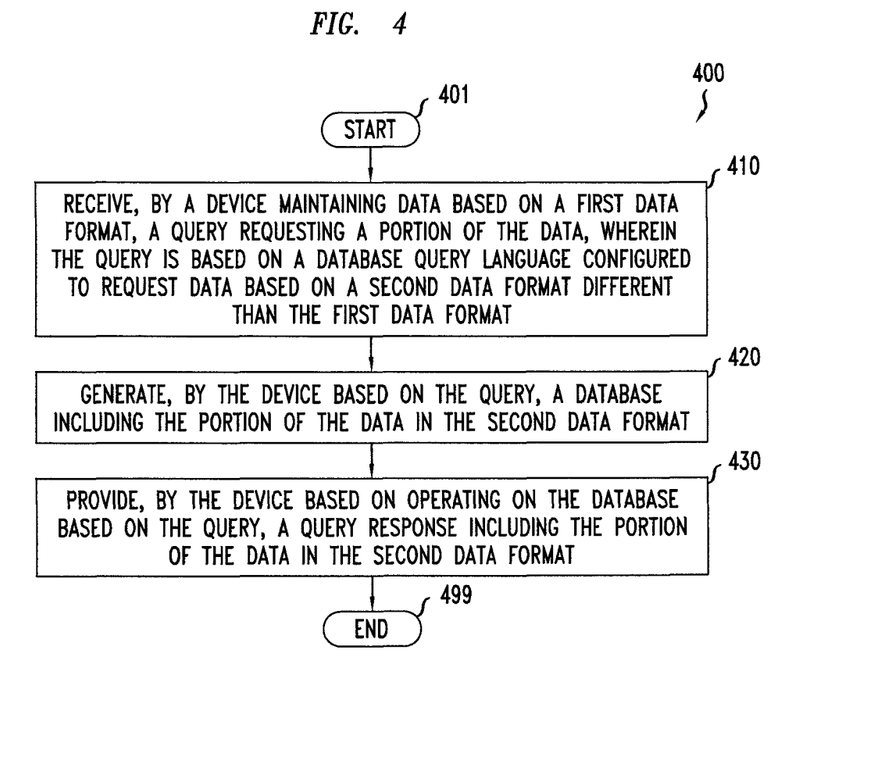
FIG. 4 depicts an example embodiment of a method for use by a device having a database to handle database queries.

FIG. 4 depicts an example embodiment of a method for use by a device having a database to handle database queries. It will be appreciated that, although primarily presented as being performed serially, at least a portion of the functions of method 400 may be performed contemporaneously or in a different order than as presented with respect to FIG. 4. At block 401, method 400 begins. At block 410, receive, by a device maintaining data based on a first data format, a query requesting a portion of the data, wherein the query is based on a database query language configured to request data based on a second data format different than the first data format. At block 420, generate, by the device based on the query, a database including the portion of the data in the second data format. At block 430, provide, by the device based on operating on the database based on the query, a query response including the portion of the data in the second data format. At block 499, method 400 ends. It will be appreciated that various embodiments presented with respect to FIGS. 1-3, as well as various uses or extensions of such embodiments for providing data retrieval flexibility in other contexts (e.g., where data is maintained on devices without using databases, for devices other than routers, and so forth), may be utilized within the context of method 400 of FIG. 4.

Various example embodiments for supporting data retrieval flexibility may provide various advantages or potential advantages. For example, various example embodiments for supporting data retrieval flexibility may support data retrieval flexibility for retrieval of data from a device that does not maintain that data using a relational database data format by supporting operation of the device as a device that supports retrieval of that data in a relational database data format using a structured query language (e.g., SQL, SQLite, or the like). For example, various example embodiments for supporting data retrieval flexibility may support data retrieval flexibility for retrieval of data from a device by supporting retrieval of data maintained at the device based on a first data format based on generation of a database storing that data in a second data format different than the first data format and using a structured query language (e.g., SQL, SQLite, or the like) configured to support retrieval of the data in the second data format from the database. Various example embodiments for supporting data retrieval flexibility may provide various other advantages or potential advantages.

Figure 5:
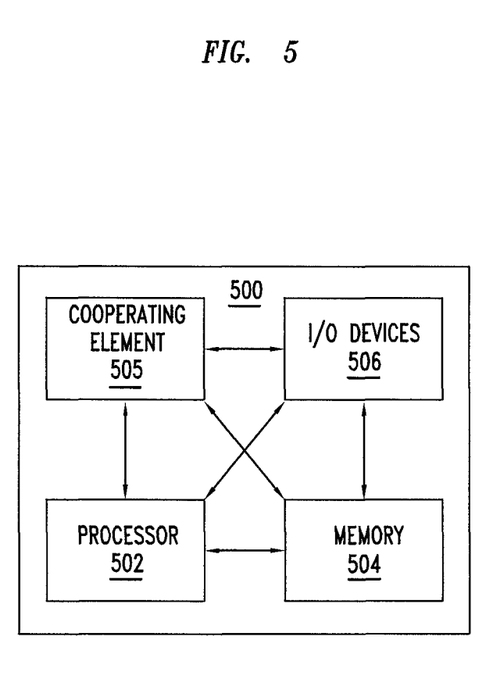
FIG. 5 depicts an example embodiment of a computer suitable for use in performing various functions presented herein.

FIG. 5 depicts an example embodiment of a computer suitable for use in performing various functions described herein.

The computer 500 includes a processor 502 (e.g., a central processing unit, a processor having a set of processor cores, a processor core of a processor, or the like) and a memory 504 (e.g., a random access memory, a read only memory, or the like). The processor 502 and the memory 504 may be communicatively connected. In at least some embodiments, the computer 500 may include at least one processor and at least one memory including program code, wherein the at least one memory and the program code are configured to, with the at least one processor, cause the computer to perform various functions presented herein.

The computer 500 also may include a cooperating element 505. The cooperating element 505 may be a hardware device. The cooperating element 505 may be a process that can be loaded into the memory 504 and executed by the processor 502 to implement functions as discussed herein (in which case, for example, the cooperating element 505 (including associated data structures) can be stored on a non-transitory computer-readable storage medium, such as a storage device or other storage element (e.g., a magnetic drive, an optical drive, or the like)).

The computer 500 also may include one or more input/output devices 506. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 500 may represent a general architecture and functionality suitable for implementing functional elements described herein, portions of functional elements described herein, or the like, as well as various combinations thereof. For example, computer 500 may provide a general architecture and functionality that is suitable for implementing one or more elements presented herein, such as a router 112 or a portion thereof, a management device 120 or a portion thereof, a router 210 or a portion thereof, a device or a portion thereof configured to execute method 400, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including program code;
   wherein the at least one memory and the program code are configured to, with the at least one processor, cause the apparatus to at least:
   receive, by a device maintaining data based on a first data format, a query requesting a portion of the data, wherein the query is based on a database query language configured to request data based on a second data format different than the first data format, wherein the second data format is a relational database data format;
   generate, by the device based on the query and based on the query being included within a command-line interface (CLI) command, a database including the portion of the data in the second data format; and
   provide, by the device based on operating on the database based on the query, a query response including the portion of the data in the second data format.

2. The apparatus of claim 1, wherein the first data format comprises a binary data format, a Yet Another Next Generation (YANG) model data format, a JavaScript Object Notation (JSON) data format, or a proprietary data format.

3. The apparatus of claim 1, wherein the database query language is a structured database query language.

4. The apparatus of claim 3, wherein the structured database query language is a Structured Query Language (SQL).

5. The apparatus of claim 4, wherein the query includes an SQL statement.

6. The apparatus of claim 1, wherein, to generate the database including the portion of the data in the second data format, the at least one memory and the program code are configured to, with the at least one processor, cause the apparatus to at least:
   identify, within the device based on the query, the portion of the data; and
   convert the portion of the data from the first data format to the second data format.

7. The apparatus of claim 6, wherein the portion of the data is identified in at least one of a device database of the device or an application of the device.

8. The apparatus of claim 6, wherein, to convert the portion of the data from the first data format to the second data format, the at least one memory and the program code are configured to, with the at least one processor, cause the apparatus to at least:
   convert the portion of the data from the first data format to the second data format directly.

9. The apparatus of claim 6, wherein, to convert the portion of the data from the first data format to the second data format, the at least one memory and the program code are configured to, with the at least one processor, cause the apparatus to at least:
   convert the portion of the data from the first data format to an intermediate data format; and
   convert the portion of the data from the intermediate data format to the second data format.

10. The apparatus of claim 9, wherein the intermediate data format comprises a plain text data format.

11. The apparatus of claim 10, wherein the plain text data format comprises a comma separated value (CSV) data format.

12. The apparatus of claim 1, wherein, to provide the query response including the portion of the data in the second data format, the at least one memory and the program code are configured to, with the at least one processor, cause the apparatus to at least:
   operate on the database, based on the query, to obtain the portion of the data in the second data format; and
   generate the query response including the portion of the data in the second data format.

13. The apparatus of claim 1, wherein the query response is included within a command-line interface (CLI) response.

14. The apparatus of claim 1, wherein the query response is provided to a user terminal.

15. The apparatus of claim 1, wherein the at least one memory and the program code are configured to, with the at least one processor, cause the apparatus to at least:
   destroy, by the device based on a determination that the query response has been provided, the database.

16. The apparatus of claim 1, wherein the at least one memory and the program code are configured to, with the at least one processor, cause the apparatus to at least:
   destroy, by the device based on a determination that the portion of the data is no longer needed, the database.

17. The apparatus of claim 1, wherein the device is a router or a server.

18. The apparatus of claim 1, wherein the device is a router and the data is router operational data of the router.

19. A non-transitory computer readable medium storing instructions configured to cause an apparatus to at least:
   receive, by a device maintaining data based on a first data format, a query requesting a portion of the data, wherein the query is based on a database query language configured to request data based on a second data format different than the first data format, wherein the second data format is a relational database data format;
   generate, by the device based on the query and based on the query being included within a command-line interface (CLI) command, a database including the portion of the data in the second data format; and
   provide, by the device based on operating on the database based on the query, a query response including the portion of the data in the second data format.

20. A method, comprising:
   receiving, by a device maintaining data based on a first data format, a query requesting a portion of the data, wherein the query is based on a database query language configured to request data based on a second data format different than the first data format, wherein the second data format is a relational database data format;

generating, by the device based on the query and based on the query being included within a command-line interface (CLI) command, a database including the portion of the data in the second data format; and providing, by the device based on operating on the database based on the query, a query response including the portion of the data in the second data format.

21. An apparatus, comprising:

at least one processor; and at least one memory including program code;

wherein the at least one memory and the program code are configured to, with the at least one processor, cause the apparatus to at least:

receive, by a device maintaining data based on a first data format, a query requesting a portion of the data, wherein the query is based on a database query language configured to request data based on a second data format different than the first data format, wherein the first data format comprises a binary data format, a Yet Another Next Generation (YANG) model data format, a JavaScript Object Notation (JSON) data format, or a proprietary data format;

generate, by the device based on the query and based on the query being included within a command-line interface (CLI) command, a database including the portion of the data in the second data format; and provide, by the device based on operating on the database based on the query, a query response including the portion of the data in the second data format.

22. A method, comprising:

receiving, by a device maintaining data based on a first data format, a query requesting a portion of the data, wherein the query is based on a database query language configured to request data based on a second data format different than the first data format, wherein the first data format comprises a binary data format, a Yet Another Next Generation (YANG) model data format, a JavaScript Object Notation (JSON) data format, or a proprietary data format;

generating, by the device based on the query and based on the query being included within a command-line interface (CLI) command, a database including the portion of the data in the second data format; and providing, by the device based on operating on the database based on the query, a query response including the portion of the data in the second data format.

* * * * *